(12) United States Patent
Tipton

(10) Patent No.: US 10,143,978 B2
(45) Date of Patent: Dec. 4, 2018

(54) BEVERAGE CARBONATION METHOD

(71) Applicant: Guy Tipton, Shelburne (CA)

(72) Inventor: Guy Tipton, Shelburne (CA)

( * ) Notice: Subject to any disclaimer, the term of this patent is extended or adjusted under 35 U.S.C. 154(b) by 112 days.

(21) Appl. No.: 15/330,675

(22) Filed: Oct. 27, 2016

(65) Prior Publication Data
US 2017/0120204 A1 May 4, 2017

Related U.S. Application Data

(60) Provisional application No. 62/285,398, filed on Oct. 28, 2015.

(51) Int. Cl.
*B01F 3/04* (2006.01)
*B65B 3/04* (2006.01)
(Continued)

(52) U.S. Cl.
CPC ............ *B01F 3/04808* (2013.01); *A23L 2/54* (2013.01); *B01F 3/04262* (2013.01); *B01F 3/04815* (2013.01); *B01F 15/00175* (2013.01); *B01F 15/00357* (2013.01); *B65B 3/04* (2013.01); *C12C 11/11* (2013.01); *A23V 2002/00* (2013.01); *B01F 2003/049* (2013.01); *B01F 2003/04319* (2013.01); *B01F 2215/0068* (2013.01)

(58) Field of Classification Search
CPC .............. B01F 3/04808; B01F 3/04262; B01F 3/04815; B01F 15/00175; B01F 15/00357; B01F 2215/0068; A23L 2/54; B65B 3/04; C12C 11/11; A23V 2002/00
See application file for complete search history.

(56) References Cited

U.S. PATENT DOCUMENTS

| | | |
|---|---|---|
| 475,853 A | 5/1892 | Feigenspan |
| 608,744 A | 9/1898 | Alberger |

(Continued)

FOREIGN PATENT DOCUMENTS

| | | |
|---|---|---|
| CN | 103771313 | 5/2014 |
| DE | 10 2008 056 795 | 5/2010 |

OTHER PUBLICATIONS

Aquarium Info Website 2009. https://web.archive.org/web/20100510213050/https://aquariuminfo.org/co2.html.*

*Primary Examiner* — Anthony J Weier
(74) *Attorney, Agent, or Firm* — Mario Theriault

(57) ABSTRACT

In a method of carbonating a beverage using a carbon dioxide diffusing stone, temperature is measured in a flow of that beverage immediately before the flow changes from laminar to effervescent, thereby obtaining a true temperature at which carbon dioxide is diffused into the beverage. In another aspect of the present invention, there is provided a portable controller having connectors joinable to a gas pressure regulator of a gas cylinder and to any one of several beverage carbonation containers. The portable controller has instruments therein for controlling a flow of carbon dioxide gas to the beverage in any one of the containers and for controlling a pressure gradient of the carbon dioxide gas in the beverage over a period of time. There is also provided an elongated carbon dioxide diffusing stone assembly having an elongated temperature probe well extending parallel to and immediately below a diffusing stone.

10 Claims, 6 Drawing Sheets

(51) Int. Cl.
    *B01F 15/00*     (2006.01)
    *A23L 2/54*     (2006.01)
    *C12C 11/11*     (2006.01)

(56) References Cited

U.S. PATENT DOCUMENTS

| | | |
|---|---|---|
| 1,261,294 A | 4/1918 | Ritchey |
| 1,945,489 A | 1/1934 | Manley |
| 2,408,439 A | 10/1946 | Muehlhofer |
| 2,514,463 A | 7/1950 | Bayers, Jr. |
| 2,580,516 A | 1/1952 | Chapplow |
| 2,926,087 A | 2/1960 | Rickers |
| 3,578,295 A | 5/1971 | Hudson |
| 3,687,684 A | 9/1972 | Wentworth et al. |
| 3,780,198 A | 12/1973 | Pahl et al. |
| 3,992,493 A | 11/1976 | Whyte et al. |
| 4,022,119 A | 5/1977 | Karr |
| 4,265,376 A | 5/1981 | Skidell |
| 4,999,140 A | 3/1991 | Sutherland et al. |
| 5,124,088 A | 6/1992 | Stumphauzer |
| 5,178,799 A | 1/1993 | Brown et al. |
| 5,199,297 A | 4/1993 | Lin et al. |
| 5,231,851 A | 9/1993 | Adolfsson |
| 5,518,666 A | 5/1996 | Plester et al. |
| 5,531,254 A | 7/1996 | Rosenbach |
| 5,704,276 A | 1/1998 | Osajuma et al. |
| 9,107,448 B2 | 8/2015 | Giardino et al. |
| 9,107,449 B2 | 8/2015 | Njaastad et al. |
| 2003/0000971 A1 | 1/2003 | Nielsen |
| 2008/0006587 A1* | 1/2008 | Cumming ................. C02F 1/66 210/756 |
| 2017/0055552 A1* | 3/2017 | Giardino ............... B01F 5/0476 |

* cited by examiner

Carbonation Guide

| C° | °F | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| -1.1 | 30 | 1.82 | 1.92 | 2.03 | 2.14 | 2.23 | 2.36 | 2.48 | 2.6 | 2.7 | 2.82 | 2.93 | 3.02 | 3.13 | 3.24 | 3.35 |
| -0.6 | 31 | 1.78 | 1.88 | 2 | 2.1 | 2.2 | 2.31 | 2.42 | 2.54 | 2.65 | 2.76 | 2.86 | 2.96 | 3.07 | 3.17 | 2.28 |
| 0.0 | 32 | 1.75 | 1.85 | 1.95 | 2.05 | 2.15 | 2.27 | 2.38 | 2.48 | 2.59 | 2.7 | 2.8 | 2.9 | 3 | 3.11 | 3.21 |
| 0.6 | 33 | 1.71 | 1.81 | 1.91 | 2.01 | 2.1 | 2.23 | 2.33 | 2.43 | 2.53 | 2.63 | 2.74 | 2.84 | 2.96 | 3.06 | 3.15 |
| 1.1 | 34 | 1.68 | 1.78 | 1.86 | 1.97 | 2.06 | 2.18 | 2.28 | 2.38 | 2.48 | 2.58 | 2.69 | 2.79 | 2.9 | 3 | 3.09 |
| 1.7 | 35 | 1.63 | 1.73 | 1.83 | 1.93 | 2.02 | 2.14 | 2.24 | 2.34 | 2.43 | 2.52 | 2.63 | 2.73 | 2.83 | 2.93 | 3.02 |
| 2.2 | 36 | 1.6 | 1.69 | 1.79 | 1.88 | 1.98 | 2.09 | 2.19 | 2.29 | 2.38 | 2.47 | 2.57 | 2.67 | 2.77 | 2.86 | 2.96 |
| 2.8 | 37 | 1.55 | 1.65 | 1.74 | 1.84 | 1.94 | 2.04 | 2.14 | 2.24 | 2.33 | 2.42 | 2.52 | 2.62 | 2.71 | 2.8 | 2.9 |
| 3.3 | 38 | 1.52 | 1.61 | 1.71 | 1.8 | 1.9 | 2 | 2.1 | 2.2 | 2.29 | 2.38 | 2.48 | 2.57 | 2.66 | 2.75 | 2.85 |
| 3.9 | 39 | 1.49 | 1.58 | 1.67 | 1.77 | 1.86 | 1.96 | 2.06 | 2.15 | 2.25 | 2.34 | 2.43 | 2.52 | 2.61 | 2.7 | 2.8 |
| 4.4 | 40 | 1.47 | 1.56 | 1.65 | 1.74 | 1.83 | 1.92 | 2.01 | 2.1 | 2.2 | 2.3 | 2.39 | 2.47 | 2.56 | 2.65 | 2.75 |
| 5.0 | 41 | 1.43 | 1.52 | 1.61 | 1.7 | 1.79 | 1.88 | 1.97 | 2.06 | 2.16 | 2.25 | 2.34 | 2.43 | 2.52 | 2.6 | 2.7 |
| 5.6 | 42 | 1.39 | 1.48 | 1.57 | 1.66 | 1.75 | 1.85 | 1.94 | 2.02 | 2.12 | 2.21 | 2.3 | 2.39 | 2.48 | 2.56 | 2.65 |
| 6.1 | 43 | 1.37 | 1.46 | 1.54 | 1.63 | 1.72 | 1.81 | 1.9 | 1.99 | 2.08 | 2.17 | 2.26 | 2.34 | 2.43 | 2.52 | 2.61 |
| 6.7 | 44 | 1.35 | 1.43 | 1.52 | 1.6 | 1.69 | 1.78 | 1.87 | 1.95 | 2.04 | 2.13 | 2.22 | 2.3 | 2.39 | 2.47 | 2.56 |
| 7.2 | 45 | 1.32 | 1.41 | 1.49 | 1.58 | 1.66 | 1.75 | 1.84 | 1.91 | 2 | 2.08 | 2.17 | 2.26 | 2.34 | 2.42 | 2.51 |
| 7.8 | 46 | 1.28 | 1.37 | 1.45 | 1.54 | 1.62 | 1.71 | 1.8 | 1.88 | 1.96 | 2.04 | 2.13 | 2.22 | 2.3 | 2.38 | 2.47 |

Volumes (PSI)

| Style | Volumes |
|---|---|
| Under Carbonated | 0 to 1.4 |
| Stouts, Porters | 1.5 to 2.2 |
| Lagers, Ales, Ambers, Most Beers | 2.2 to 2.6 |
| Highly Carbonated Ales, Wheat, Lambics | 2.6+ |

FIG. 1
PRIOR ART

BEVERAGE CARBONATION METHOD

This application claims the benefit of U.S. Provisional Patent Application No. 62/285,398, filed on Oct. 28, 2015.

FIELD OF THE INVENTION

This invention pertains to beverage carbonation, and more particularly it pertains to a system and a method for precisely controlling a pressure/temperature gradient in a beer carbonation process.

BACKGROUND OF THE INVENTION

The process of adding carbonic acid to a freshly fermented beer has been known since at least 1892. In U.S. Pat. No. 475,853, issued to C. Feigenspan on May 31, 1892, there is described therein a method for carbonating beer. The document describes a process where a volume of freshly fermented beer in a closed cask is circulated by a pump along a pipe circuit. A carbonic acid injector is mounted in the pipe circuit for injecting carbonic acid in the beer. The purpose of adding carbonic acid to beer was to produce a superior quality beer. Complete saturation of the beer in the cask with carbonic acid was obtained in a period of two hours or less, thereby establishing a "time factor" in a beer carbonation recipe. The pressure inside the cask at the saturation level reached ten to twelve pounds per square inch, thereby establishing a "finish pressure factor" in a beer carbonation recipe.

It has been until 1946 before beer makers recognized that temperature was also a critical factor in the carbonation of beer. U.S. Pat. No. 2,408,439 issued to R. Muehlhofer on Oct. 1, 1946, teaches that the beer temperature for carbonation is best between 36 to 38° F. A cooling coil in the lower portion of the beer tank and a thermostat valve were provided for maintaining beer at that temperature.

A few years later, U.S. Pat. No. 2,514,463 issued to G. W. Bayers, Jr., on Jul. 11, 1950, disclosed that a carbonation process is best carried out when the beer temperature is at 34° F. A number of additional publications have emphasized the use of temperature sensors and cooling systems to maintain the beverage at a low temperature during a carbonation process. The following documents disclose different systems using either a temperature monitoring or controlling devices or both during a beverage carbonation process.

U.S. Pat. No. 3,780,198 issued to L. F. Pahl et al., on Dec. 18, 1973;
U.S. Pat. No. 4,022,119 issued to F. A. Karr on May 10, 1977;
U.S. Pat. No. 5,124,088 issued to W. C. Stumphauzer, on Jun. 23, 1992;
U.S. Pat. No. 5,704,276 issued to Y. Osajima et al., on Jan. 6, 1998.

As understood from the above documents, the prior art before 1971 have taught of three critical factors in a beer carbonation process: "process duration"; "finish pressure" and "a cool temperature". A fourth and fifth critical factors have been taught in U.S. Pat. No. 3,578,295 issued to J. L. Hudson, on May 11, 1971. Hudson teaches that "there are four principle factors in carbonating water: (1) agitation or the mixing of water and gas by stirring the water in the gas atmosphere; (2) the pressure of the gas within the receptacle; (3) the temperature of the liquid, such as water, to be saturated with gas, since cold water has a strong affinity for absorbing carbon dioxide gas; and (4) the length of time during which carbonation is carried out". Hudson also used a carbonation ratio of 3 to 4 volumes of gas to one volume of beverage.

A few years later, it has been recognized that a relation between the pressure of $CO_2$ entering the carbonation receptacle and the temperature of the beverage to be carbonated is also an important factor in a beer carbonating process. In that respect, both publications listed below recognized that a pressure/temperature relation must be precisely controlled to obtain repeatability in beer taste and quality. These publications are:

U.S. Pat. No. 5,178,799 issued to J. Brown et al., on Jan. 12, 1993; and
US Publication 2003/0000971 by T. L Nielson on Jan. 2, 2003.

A number of additional documents have been found in the prior art describing different advances in processes and equipment for carbonating beverages. These documents are listed below for reference purposes to demonstrate the evolution and the state of the art in the field of beverage carbonation.

U.S. Pat. No. 608,744, issued to J. L. Alberger on Aug. 9, 1899;
U.S. Pat. No. 1,261,294, issued to M. V. Ritchey on Apr. 2, 1918;
U.S. Pat. No. 1,945,489 issued to J. R. Manley on Jan. 30, 1934;
U.S. Pat. No. 2,580,516 issued to W. L. Chapplow on Jan. 1, 1952;
U.S. Pat. No. 2,926,087 issued to F. O. Rickers on Feb. 23, 1960;
U.S. Pat. No. 3,687,684 issued to R. L. Wentworth et al., on Aug. 29, 1972;
U.S. Pat. No. 3,992,493 issued to D. D. Whyte et al., on Nov. 16, 1976;
U.S. Pat. No. 4,265,376 issued to S. S. Skidell on May 5, 1981;
U.S. Pat. No. 4,999,140 issued to A. J. Sutherland et al., on Mar. 12, 1991;
U.S. Pat. No. 5,231,851 issued to B. Adolfsson on Aug. 3, 1993;
U.S. Pat. No. 5,518,666 issued to G. Plester et al., on May 21, 1996;
U.S. Pat. No. 5,531,254 issued to A. Rosenbach on Jul. 2, 1996;
U.S. Pat. No. 9,107,448 issued to N. Giardino et al., on Aug. 18, 2015;
U.S. Pat. No. 9,107,449 issued to D. K. Njaastad et al., on Aug. 18, 2015;
DE Patent 10 2008 056 795 issued to A. Hofmann on May 27, 2010.

In short, the prior art teaches or mentions the following important factors to be considered in a beverage carbonation process:

(1) the agitation or the mixing of water and gas;
(2) the pressure of the gas within the carbonation receptacle;
(3) the temperature of the liquid to be saturated with gas;
(4) the length of time, or the inflow of gas during the carbonation phase;
(5) the pressure gradient during the carbonation phase;
(6) the volume ratio between volume of $CO_2$/volume of liquid;
(7) the pressure/temperature ratio during the carbonation phase;
(8) the finish pressure of the carbonated beverage.

Based on the above factors, beer brewers have developed a general carbonation guide for different type of beers, as illustrated in the accompanying FIG. 1. This guide provides a volume of gas to be absorbed by a volume of beer at a specific temperature and pressure, to obtain a specific style of beer. Although this general carbonation guide is well known, individual brewers have developed their own recipes to produce and reproduce particular brands of beer and different flavors within each brand. Each flavor is distinguishable by the basic cereal with which it is produced. Each flavor is also distinguishable by its $CO_2$ content and by the way the carbonating process is being carried out.

Referring to FIG. 2 in the attached drawings, each beer flavor is distinguishable by a $CO_2$ pressure/flow gradient during the carbonating phase and by the final or finish pressure of the beer of a specific flavor. These flavor recipe curves are developed by brewers and are normally kept as trade secrets.

It will be appreciated that these flavor recipe curves are indirectly dependent on temperature, as a pressure/temperature relation is perhaps the most important factor in the affinity of a beer for absorbing carbon dioxide gas.

In the prior art, the temperature sensors have been mounted inside the beverage tank, near the top of the tank; near the wall of the tank, or outside the tank in a beverage recirculating pipe. Because the temperature of a fluid varies substantially within a same container, the methods to measure temperature as taught in the prior art are not considered sufficiently accurate, given that this measurement is detrimental to the success and repeatability of a beer flavor recipe. The placement of a temperature probe near the top of a tank, for example, is done with the assumption that the entire content of the tank is at a same temperature.

Beer temperature inside a carbonation tank can vary a few degrees, whether the sensor is placed at the top, the middle or at the bottom of the tank. Beer temperature also varies from near the wall of the tank to a region near the point of entry of the $CO_2$ into the tank and the point of mixing of $CO_2$ into the beverage. Beer temperature is also depending upon many factors such as heat transfer through the tank wall, the heat generated by pumping equipment, heat transfer through pipe insulation, etc.

As it is mentioned in U.S. Pat. No. 5,178,799 issued to Brown et al., on Jan. 12, 1993, when beverage temperature increases, the pressure in the $CO_2$ supply line must also be increased to maintain the same carbonation level. Beverage temperature varies due to daily, seasonal, or geographic trends, and can cause excessive levels of carbonation resulting in excess carbonation, high foaming levels and wastage during bottling. Similarly, the under-carbonation of a volume of beer causes product returns due to shortfalls in client's expectations.

While the measurement and control of flow, time and pressure can be easily done precisely with modern instruments, temperature remains elusive within a same volume of beverage. In order to maintain a volume of beverage at an exact temperature for a period of time, the beverage container and the cooling equipment needs to be operated for an extended period of time after filling, to ensure that all components of that system are at a same temperature. Furthermore, the beverage itself needs to be acclimated to the reservoir and circulated entirely for an extended period of time to ensure an homogenous temperature throughout the beverage.

Furthermore, the maintaining of a volume of beverage at the same temperature also requires that the $CO_2$ dispersed into the beverage be dissipated at the same temperature as the beverage to be treated. Such a procedure requires sophisticated equipment and a complex installation. Such a procedure lengthens the carbonation process. This equipment and installation are not always suitable to a micro-brewery where profit margins are modest.

Therefore, it is believed that there is a need in the craft brewing industry for a better system and a better method for precisely and economically monitoring beer temperature during a beer carbonation process. There is a need in the micro-brewery field for an economical system and method to precisely control a pressure/temperature ratio so that beer flavor is accurately repeatable and beer quality is as good as the product of large breweries.

In another aspect of beer carbonation, it is generally known that micro-breweries prefer to operate their processes at low pressure of less than 15 psi. A low pressure system is not subject to stringent regulations, worker qualification and re-qualification and frequent safety inspections and audits. Therefore, it is also believed that there is a need in this field for a carbonation process that can be carried out at low pressure.

SUMMARY OF THE PRESENT INVENTION

In the present invention, there is provided a system for monitoring beverage temperature with a high precision, so that the repeatability of a specific beverage flavor can be better obtained and repeated. The beverage carbonation system and method according to the present invention is carried out at low gas pressure.

In a first aspect of the present invention, there is provided a method of carbonating a beverage. This method comprises the steps of:

creating an upward laminar flow in the beverage;
during a period of time, forcing carbon dioxide gas bubbles into the upward laminar flow of the beverage, thereby changing the upward laminar flow to an upward effervescent flow;
using the carbon dioxide gas, applying a pressure gradient on the beverage during the period of time;
measuring a temperature of the beverage immediately before the upward laminar flow changes to the upward effervescent flow, and
adjusting the pressure gradient according to the temperature measured.

The temperature probe being mounted at a location where the flow changes from laminar to effervescent provides a true reading of the temperature of the beverage at the point of mixing $CO_2$ into the beverage. The temperature probe mounted at that location provides an immediate reading of the true temperature, thereby eliminating any buffer period or delay in the adjustment of pressure in the tank.

In another aspect of the present invention, there is provided a system comprising: a first and second containers of beverage each having a carbon dioxide diffusing stone mounted therein; a temperature probe mounted immediately below the carbon dioxide diffusing stone, and a fill pipe therein. The first and second containers each having respective connections there through to their respective carbon dioxide diffusing stone, temperature probe, head space and fill pipe. The preferred system also comprises a tank of carbon dioxide gas under pressure having a gas pressure regulator mounted thereto. The present system also comprises a portable controller having a first set of connectors joinable to the gas pressure regulator and to the respective connections of either the first or second containers. The portable controller has instruments mounted therein for controlling a flow of the carbon dioxide gas to the beverage and a pressure gradient of the carbon dioxide gas in the beverage in one of the first and second containers over a period of time.

At the end of the carbonation of the beverage in the first container, the portable controller can be disconnected from the first container and connected to the second container, while the fill pipe of the first container is connected to a bottling installation, for example. A single portable controller can be used to operate a multi-tank brewery.

In yet another aspect of the present invention, there is provided a carbon dioxide diffusing stone assembly comprising: a first gas-porous stone mounted to an elongated tubular holder. An elongated temperature probe well extends parallel to and below the elongated tubular holder and the first stone. The carbon dioxide diffusing stone assembly also comprises a bunghole plug having a first and second parallel holes there through, wherein the elongated tubular holder extends through the first hole and the temperature probe well extends through the second hole.

When the carbon dioxide diffusing stone assembly is mounted in the bunghole of a beverage container, the temperature probe is located immediately before the flow of beverage in a tank changes from laminar to effervescent.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the beverage carbonation system and method according to the present invention is described herein with the aid of the accompanying drawings in which like numerals denote like parts throughout the several views:

FIG. 1 is a low-pressure carbonation guide used by many breweries for the carbonation of different styles of beer;

The drawings presented herein are presented for convenience to explain the functions of all the elements included in the beverage carbonation system according to the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings and should not be scaled. Similarly, the word "beverage" is used herein to designate beer, water or other beverages or fluids capable of being carbonated.

DESCRIPTION OF THE PREFERRED EMBODIMENT

Figure 2:
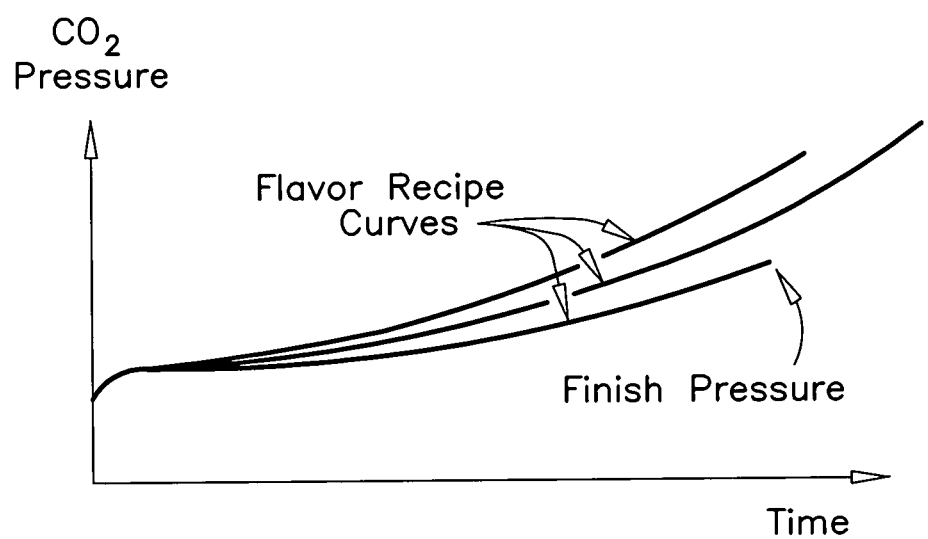
FIG. 2 shows different flavor recipe curves used in a beer carbonation process.
Figure 3:
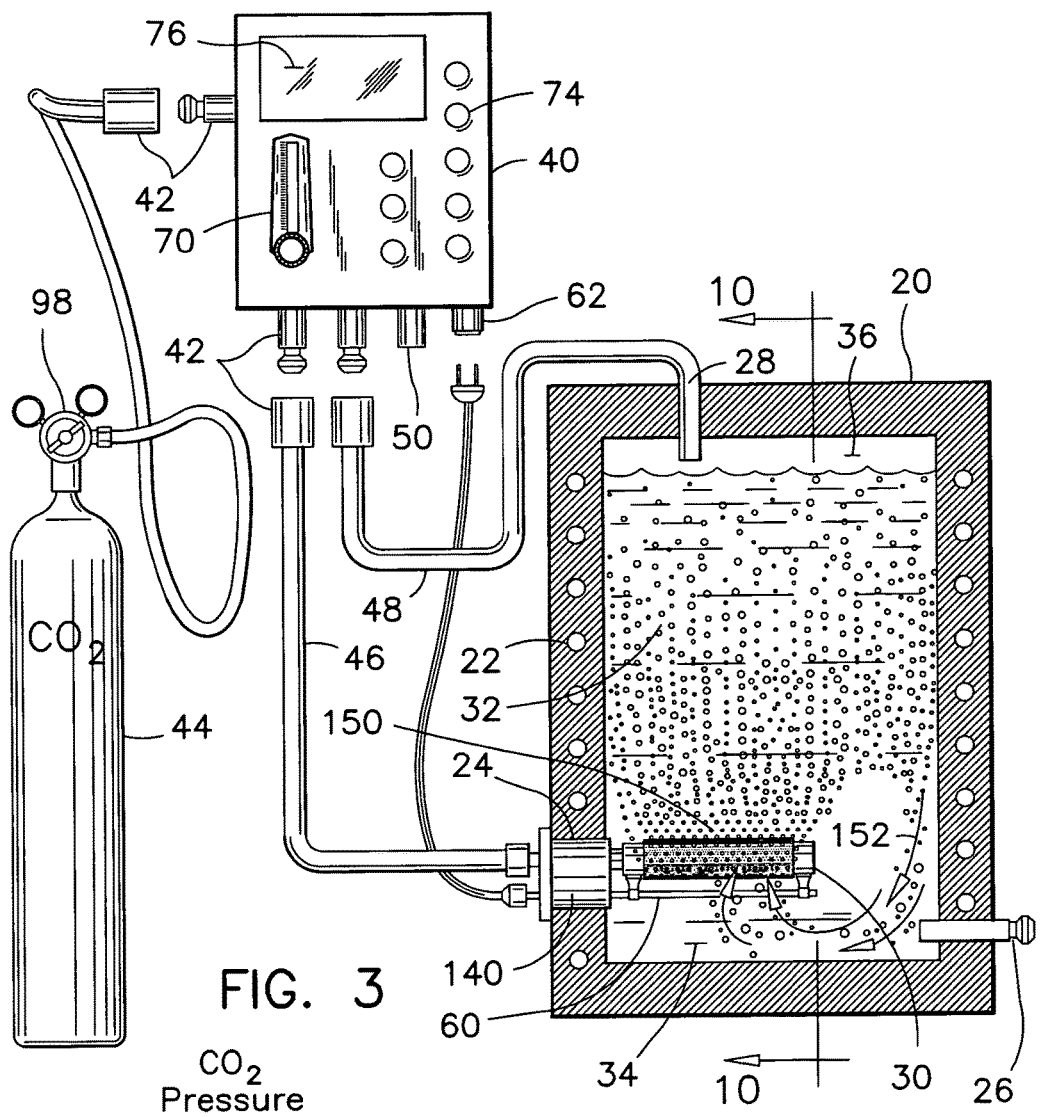
FIG. 3 illustrates the elements included in the beverage carbonation system according to the preferred embodiment of the present invention.

Referring firstly to FIG. 3 there is presented therein a complete assembly of the beverage carbonation system according to the preferred embodiment of the present invention. Specifically, the preferred carbonation system comprises a tank 20 or container including a cooling jacket 22 there-around. The tank has a bunghole 24 on one side, a fill pipe 26 on the other side, and a vent pipe 28 at the top. In use, a $CO_2$ diffusing stone assembly 30 is mounted in the bunghole 24 for mixing bubbles 32 of $CO_2$ into the beverage 34 in the tank 20.

During a carbonation process, the tank 20 is filled with a beverage, freshly fermented beer for example, almost to maximum capacity, leaving only a small head space 36 at the top. The rate and pressure of $CO_2$ absorption into the beverage 34 of the tank is controlled by a portable programmable instrument, referred to herein as the portable controller 40.

The portable controller 40 has quick disconnect-reconnect connections 42 for coupling a supply bottle 44 of $CO_2$ to the supply line 46 to the diffusing stone assembly 30, and for coupling the line 48 of the vent pipe 28 to a vent nozzle 50. A temperature probe well 60 is mounted to the diffusing stone assembly 30. A temperature probe (not shown) inside the temperature probe well 60 is electrically connected to a receptacle 62 on the side of the portable controller 40.

The portable controller 40 also has an adjustable $CO_2$ flow valve 70 therein for adjusting the inflow of $CO_2$ to the diffusing stone assembly 30. Programming buttons 74 and a display screen 76 are also provided in the front face of the portable controller 40 to facilitate the programming of different flavor recipe curves.

Figure 4:
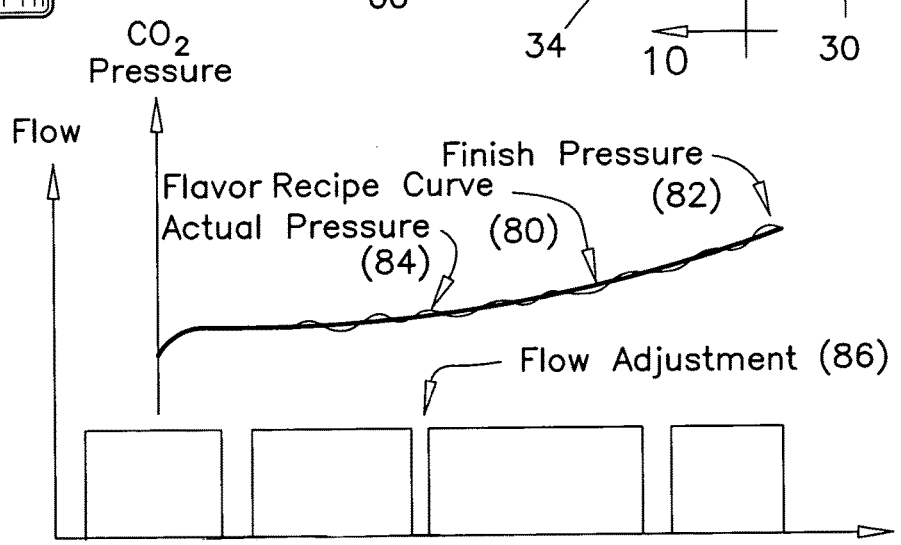
FIG. 4 is graph showing a beverage carbonation process being carried out according to a flavor recipe curve, using the instruments according to the preferred embodiment of the present invention.

Referring to FIG. 4, there is illustrated therein a flavor recipe curve showing a carbonation time along the x-axis, a pressure gradient 80 and a finish pressure 82. It will be appreciated that the actual production of this recipe tends to follow the pressure gradient curve 80 as accurately as possible, with pressure variations 84 that are as small as possible. In order to achieve a tight-fit match of a flavor recipe curve, the portable controller 40 controls the flow of $CO_2$ in an on-off mode as seen in line 86. The portable controller 40 also controls the pressure in the $CO_2$ supply line 46.

In order to control the pressure in the $CO_2$ supply line 46, the portable controller 40 interrupts the flow of $CO_2$ through the flow control valve 70; it circulates. $CO_2$ from the head space 36, to a vent nozzle 50 or into the supply line 46 of the dissipating stone assembly 30.

The selection of the three options, a) flow valve 70 on-off; b) head space 36 to vent nozzle 50; and c) head space 36 to $CO_2$ supply line 46, are programmable in the portable controller 40. The selection of one option or the other generally depends on the rate of pressure increase or decrease in the head space 36, the pressure in the $CO_2$ supply line 46 during the immediate past time period, or upon the location of the process along the flavor recipe curve 80.

The rate of flow of $CO_2$, the duration of a process, the finish pressure and the mode of pressure control, all contribute to obtaining a tight-fit match of a favor recipe curve. Therefore these data are kept by a brewer as a trade secret.

Figure 5:
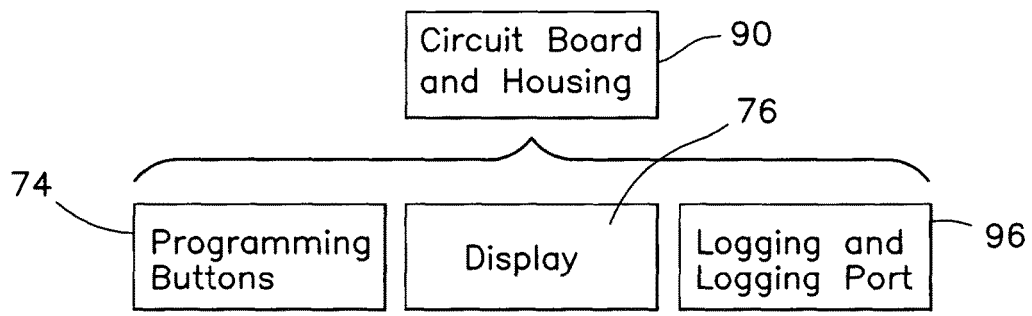
FIG. 5 is a block diagram of the circuit board in the preferred beverage carbonation system.
Figure 6:
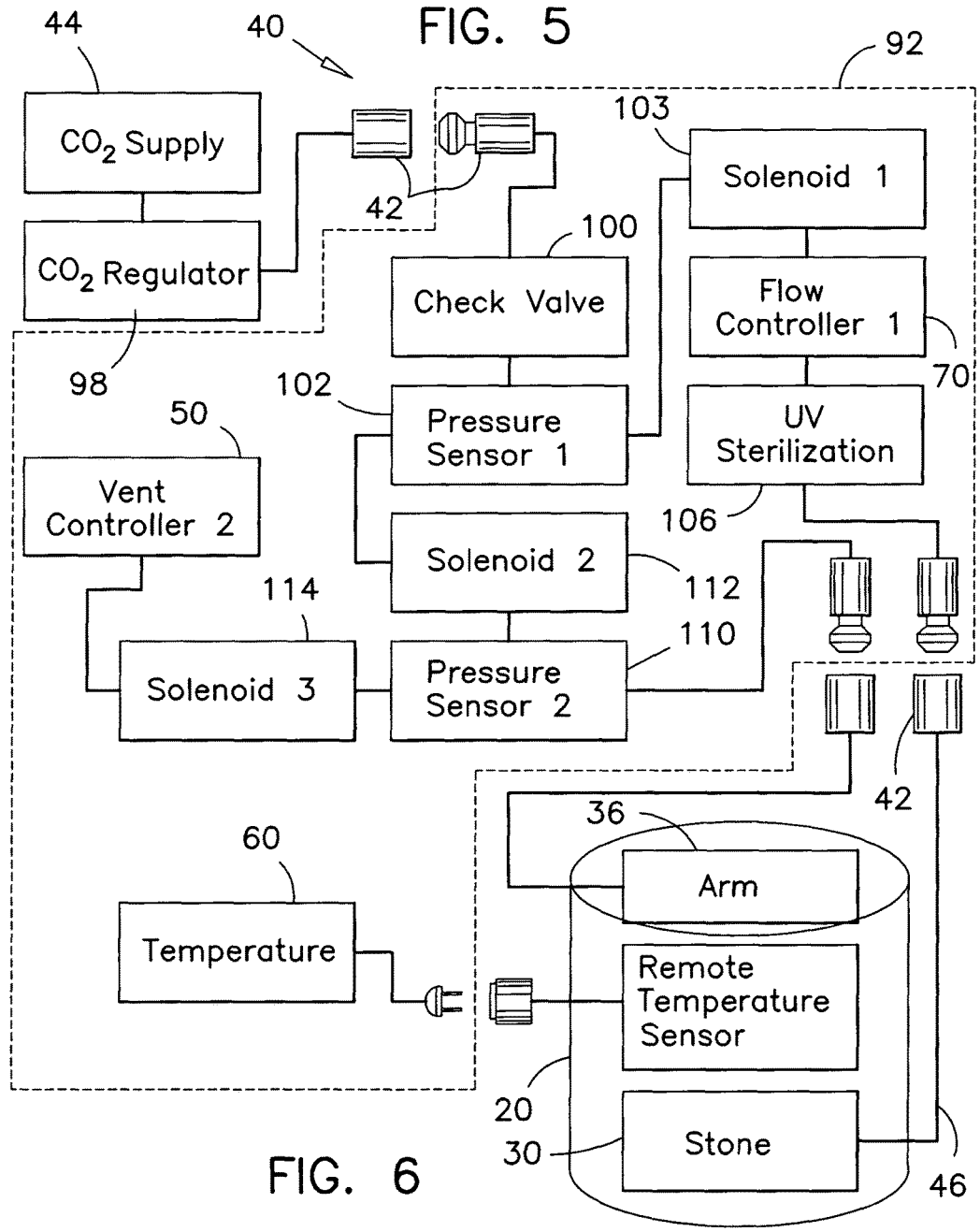
FIG. 6 is a block diagram of the elements and function of the preferred beverage carbonation system.
Figure 7:
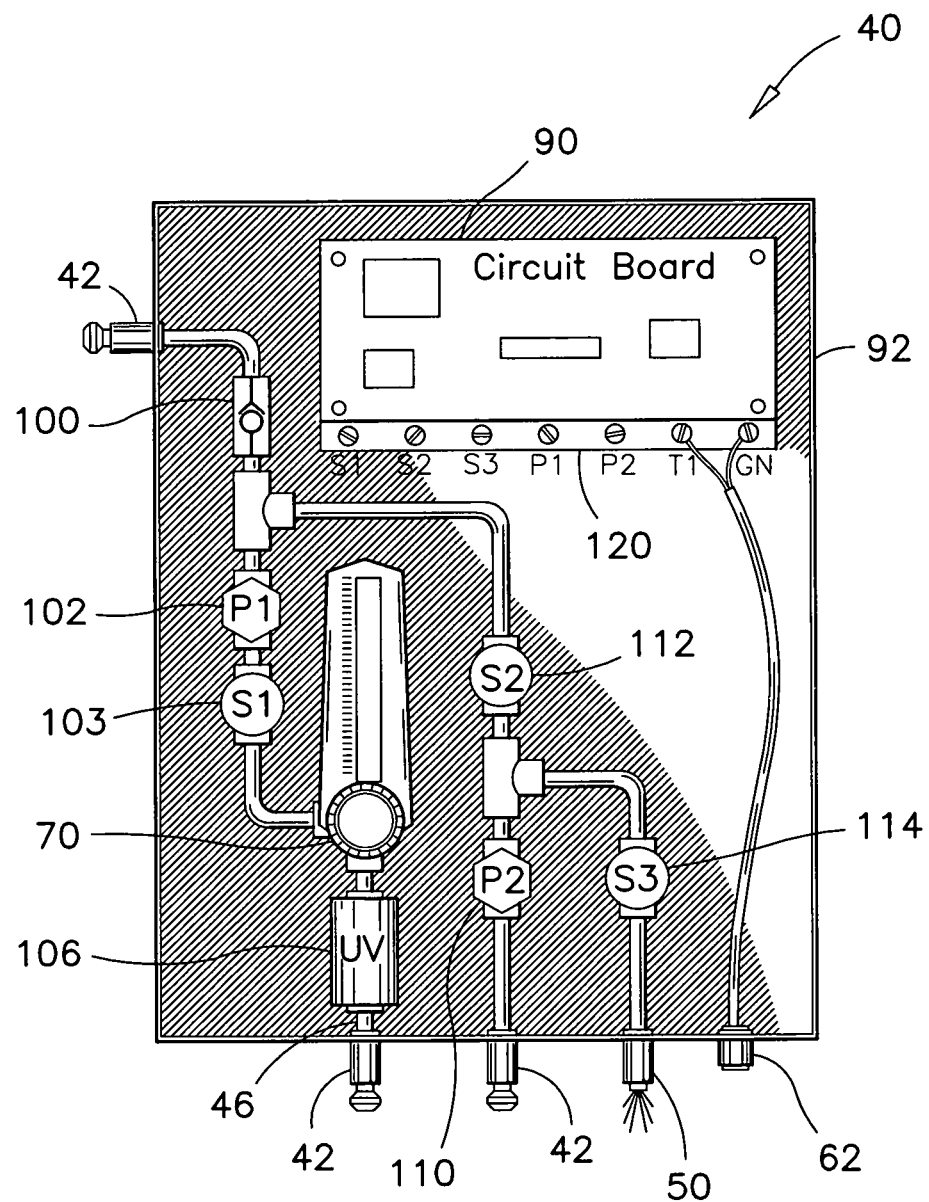
FIG. 7 is a plan view of the elements inside the housing of the portable controller in the beverage carbonation system according to the preferred embodiment of the present invention.

Referring now to FIGS. 5-7, there is illustrated therein three diagrams of the portable controller 40. The portable controller 40 includes a circuit board 90 inside a housing 92. The housing 92 has the aforesaid display screen 76 and programming buttons 74.

The circuit board 90 has an Internet/telephone/network logging equipment 96 such that it can be programmed from a remote location, or it can communicate to a remote receiver. The circuit board 90 also has a programmable computer incorporated therein capable of storing one or more flavor recipe curves 80.

Referring particularly to FIGS. 3, 6 and 7, the $CO_2$ pressure is set at the regulator 98 on the $CO_2$ tank 44. The tank 44 is connected to a quick disconnect-reconnect connection 42 and to the elements inside the portable controller 40. The $CO_2$ supply line from the tank 44 is serially connected to a one-way check valve 100, to a first pressure sensor 102 and then to a first solenoid valve 103. The first solenoid valve 103 feeds the flow controller 70. The flow of $CO_2$ from the controller 70 is optionally passed through a sterilizing UV light unit 106 and then fed to the supply line 46 of the dissipating stone assembly 30.

The pressure of $CO_2$ gas accumulating at the head 36 of the reservoir 20 is read by a second pressure sensor 110. This excess $CO_2$ gas can be directed through a second solenoid valve 112 and to the first pressure sensor 102 to be fed back to the supply line 46, or directed to a third solenoid valve 114 and exhausted to the vent nozzle 50.

Referring to FIG. 7, the circuit board has a I/O terminal strip 120 to connect the elements of the portable controller 40 to the computer of the circuit board 90.

Figure 8:
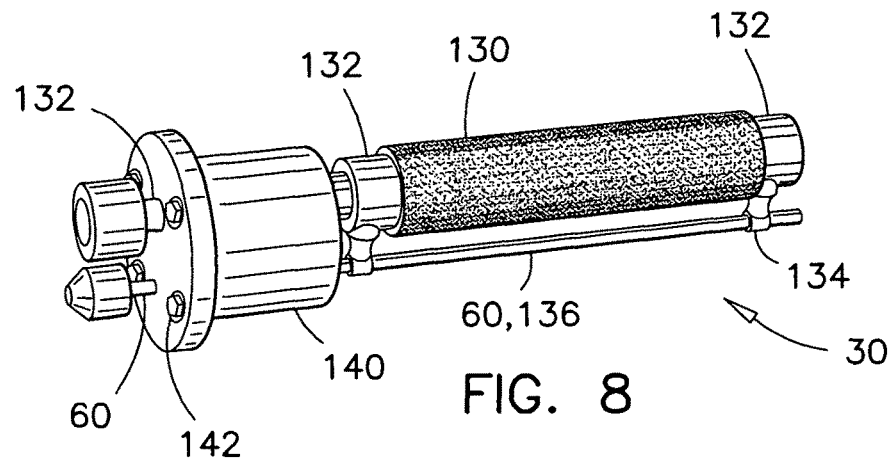
FIG. 8 is perspective view of a first model of $CO_2$ diffusing stone assembly in the beverage carbonation system according to the preferred embodiment of the present invention.

A first diffusing stone assembly 30 is best illustrated in FIG. 8. The diffusing stone assembly 30 comprises one porous cylindrical stone 130 through which $CO_2$ is pumped, causing tiny bubbles of $CO_2$ to be dispersed from the stone 130. The stone 130 is mounted to an elongated tubular holder 132. A series of brackets 134 extend downward from the tubular holder 132 and support a temperature probe well 60, in which a temperature probe 136 can be inserted. Both the temperature probe well 60 and the tubular holder 132 extend through a single bunghole plug 140. The bunghole plug 140 is sealable into the bunghole opening 24 of the tank 20 by means of compressing screws 142 for example, or otherwise.

Figure 9:
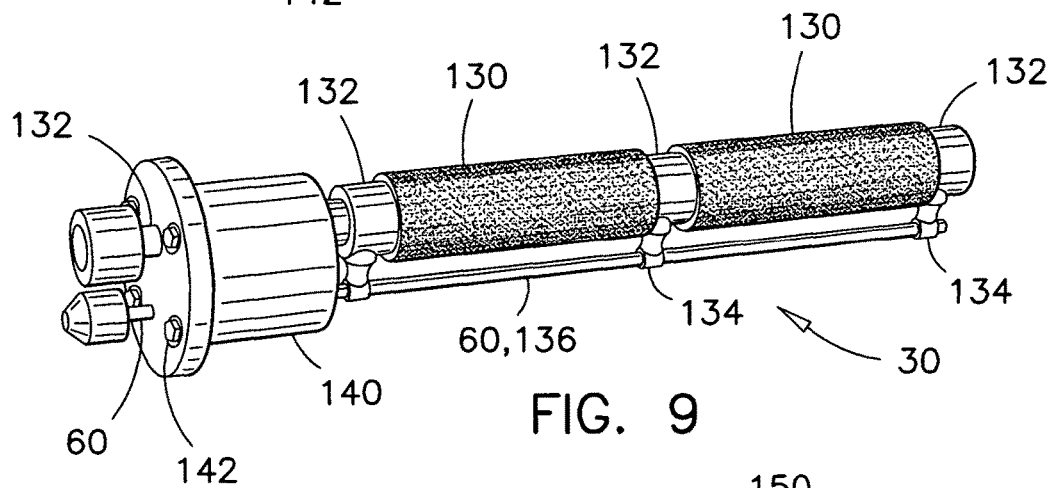
FIG. 9 is perspective view of a second model of $CO_2$ diffusing stone assembly in the beverage carbonation system according to the preferred embodiment of the present invention.

The diffusing stone assembly 30 can comprise two or more stones 130 as illustrated in FIG. 9. The structural arrangement of the diffusing stone assembly 30 and its mounting through a single bunghole plug 140 make it appropriate to satisfy many different installations. The number of stones 130 is selected according to the size of beverage reservoir in which the stones are mounted, basically, and the choice of the designer.

Figure 10:
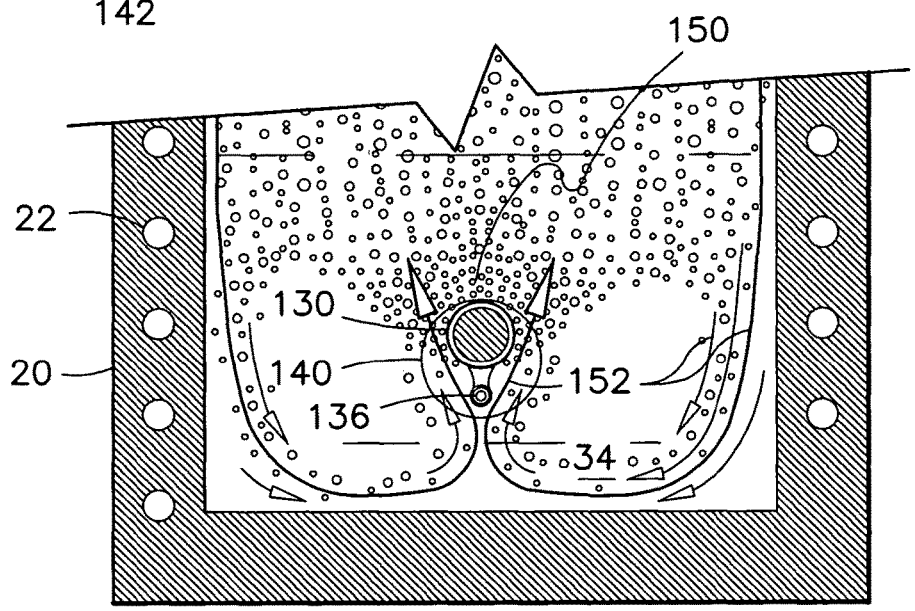
FIG. 10 is a partial cross-section view of the reservoir in FIG. 3, as seen along line 10-10 in FIG. 3.

Referring now to FIGS. 3 and 10, it will be appreciated that the $CO_2$ being forced through the diffusing stone assembly 30 cause a region of effervescence 150 around and above the stones 130. This region of effervescence 150 causes the beverage in the center of the tank to rise, thereby creating a vertical upward flow at the center of the tank, and a vertically downward flow along the walls of the tank 20 substantially as indicated by the arrows 152 in FIGS. 3 and 10. The cooler walls of the tank also contribute to this downward flow near the walls of the tank.

As can be understood, the downward flow 152 entrains the beverage content from the bottom of the tank to rise passed the diffusing stone assembly 30. The beverage at the top is then forced downward as mentioned above, and to rise again passed the diffusing stone 130. The location of the diffusing stone assembly 30 in a lower central region of the reservoir 20 is preferred as the stone at this location creates the agitation factor that is required in a carbonation process.

By the arrangement of the diffusing stone assembly 30, the temperature probe 136 is located in a laminar fluid flow immediately before this fluid flow changes from a laminar mode to an effervescent mode. The measurement of temperature at that location provides a true value of the temperature at which $CO_2$ is introduced into the beverage.

It is believed that better results are obtained in controlling the pressure of $CO_2$ being dispersed in the beverage according to a pressure/temperature ratio that corresponds to the temperature measured immediately before effervescence starts to occur. The measurement of temperature at that location eliminates any possible errors in controlling the pressure/temperature ratio of a flavor recipe curve. The measurement of temperature at that location eliminates adverse heat loss or heat transfer influences that could introduce false values in this P/T factor.

In the system according to the preferred embodiment, temperature is measured with a precision of 0.1° C. (0.18° F.), and the pressure/temperature ratio as well as the finish pressure are calculated accordingly.

As can be seen in FIGS. 3 and 10, an advantage in producing small $CO_2$ bubbles is that some of these bubbles are kept in suspension and entrained in the laminar flow 152 mentioned above. Therefore, it should be appreciated that the laminar and effervescent flows mentioned herein are referred to the beverage flow below and above the dissipating stone assembly 30, respectively.

The preferred diffusing stone 30 is referred to as a 0.2 micron pore size stone. The preferred diffusing stone 130 is mounted on a tubular holder 132 and can be taken apart from the holder 132 by means of lockring (not shown) or otherwise. Therefore, the diffusing stone 130 can be cleaned periodically and maintained free of pore obstructions.

The quick disconnect-reconnect couplings 42 used in the preferred system are advantageous to the small breweries in that a single portable controller 40 can be used with several carbonation tanks. The quick disconnect-reconnect couplings 42 used in the preferred system are also advantageous to the small breweries in the calibration of the flow of the $CO_2$ through the diffusing stone assembly 30.

In a preferred method of calibration, the $CO_2$ diffusing stone assembly 30 is placed in a bath of water. Its $CO_2$ supply line 46 is connected to the portable controller 40 and to a tank 44 of $CO_2$. The pressure setting on the regulator 98 of the $CO_2$ tank 44 is set to overcome the head pressure of the fluid in the tank 20, the pressure losses through the diffusing stone 30 and to maintain a pressure that is inside the ranges of the carbonation guide as illustrated in FIG. 1. At all times, the pressure inside the supply line 46 and inside the tank 20 is kept under 15 psi.

With the stone in a bath of water, the flow of $CO_2$ to the $CO_2$ diffusing stone assembly 30 is then increased by adjustment of the adjustable flow control valve 70, until a desired flow of $CO_2$ bubbles is obtained. The size and density of bubbles are selected visually and subjectively. However, a brewer quickly develops a good judgement by this method to obtain an optimum flow of $CO_2$ from a particular type of diffusing stone.

More specifically, the preferred flow of $CO_2$ from the stone 30 is increased until the bubbles exiting the stone form a uniform layer with an uniform density across the entire surface of the stone. This becomes the maximum flow for that stone.

Operating the carbonation system at this maximum flow ensures that the bubble sizes are small. Small $CO_2$ bubbles have low buoyancy, ensuring a long residence time in suspension in the beverage, with less opportunity for the bubbles to reach the head space 36. Keeping the bubble size small also has the advantage of relatively increasing the pressure differential of the $CO_2$ gas inside the bubbles over ambient pressure outside each bubble. This phenomenon is explained by the LaPlace pressure equation, which teaches in a simplified version that $\Delta P=$(surface tension)$\times$(2/bubble radius). Furthermore, because of the geometry of spherical bubbles, a surface to volume ratio is larger with smaller bubbles. Thus, smaller $CO_2$ bubbles improve solubility, dissipation and carbonation efficiency.

The portable controller 40 having quick disconnect-reconnect fittings 42, 62 is advantageous to the craft brewing industry in that a first volume of beer can be carbonated in a first tank 20 while a second volume of beer in a second tank is being pumped out and bottled, for example. A number of tanks, each having a $CO_2$ diffusing stone assembly 30 and appropriate fittings, can be alternatively connected to the same portable controller 40 using different flavor recipe for producing small batches of different flavors of beer. Instrumentation cost to a small brewer is thereby reduced.

When carbonation has been completed in one tank 20, the portable controller 40 can also be used to maintain or to increase $CO_2$ pressure in the head space 36 of that tank 20, to assist in emptying the tank 20, or bottling the beverage inside the tank 20.

Another advantage of the portable controller 40 is that it can be used to efficiently purge undesirable gases out of a tank of beer. The beverage carbonation system according to the present invention is used to pump $CO_2$ gas into the tank to an amount of at least one volume of beer in the tank. Undesirable gases such as Oxygen, Hydrogen and Sulfuric gases, are cause to rise and to accumulate in the head space 36 of the tank. These undesirable gases are vented out of the tank, and a carbonation process can be started.

While one embodiment of the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. A method of carbonating a beverage, comprising the steps of:
   creating an upward laminar flow in said beverage;
   during a period of time, periodically forcing carbon dioxide gas bubbles into said beverage, in said upward laminar flow of said beverage, thereby changing said upward laminar flow to an effervescent flow;
   using said carbon dioxide gas, applying a pressure gradient on said beverage during said period of time;
   measuring a temperature of said beverage immediately before said upward laminar flow changes to said effervescent flow, and
   adjusting said pressure gradient according to a pressure/temperature ratio dependent on said temperature.

2. The method as claimed in claim 1, wherein said steps of measuring a temperature and adjusting said pressure gradient are repeated periodically.

3. The method as claimed in claim 1 wherein said beverage is contained in a container and said step of changing said upward laminar flow to an effervescent flow is effected in a central lower portion of said container.

4. The method as claimed in claim 2, wherein said step of measuring a temperature is effected with a precision of 0.1° C. (0.18° F.).

5. The method as claimed in claim 1, further including the step of maintaining a majority of said carbon dioxide gas bubbles in suspension in said beverage.

6. The method as claimed in claim 3, wherein said step of adjusting said pressure gradient is effected by one of the following steps:
   momentarily interrupting said step of periodically forcing carbon dioxide gas bubbles into said beverage;
   venting a portion of said carbon dioxide gas outside said container; and
   venting a portion of said carbon dioxide gas outside said container and forcing said portion of said carbon dioxide gas back into said beverage.

7. The method as claimed in claim 1, wherein said steps of applying a pressure gradient and adjusting said pressure gradient are effected at a pressure of less than 15 psi.

8. The method as claimed in claim 1, further including the step of selecting a maximum flow of said carbon dioxide gas bubbles in said step of periodically forcing carbon dioxide gas bubbles into said beverage.

9. The method as claimed in claim 8, wherein said step of selecting a maximum flow comprises the step of:
   forcing said carbon dioxide gas through a carbonation stone and selecting said maximum flow of said gas bubbles when said gas bubbles exit said stone and form an uniform layer of bubbles with an uniform density, from an entire surface of said stone.

10. The method as claimed in claim 3, further comprising the steps of increasing a carbon dioxide gas pressure inside said container and emptying said container by force of said carbon dioxide gas pressure.

* * * * *